Jan. 10, 1967    J. W. ADAMS ETAL    3,297,099
ROCK DRILL REAMER
Filed March 28, 1964    4 Sheets-Sheet 1

INVENTORS
JOHN W. ADAMS
EDWARD F. WICKENS
BY
Daniel W. Tillett
ATTORNEY

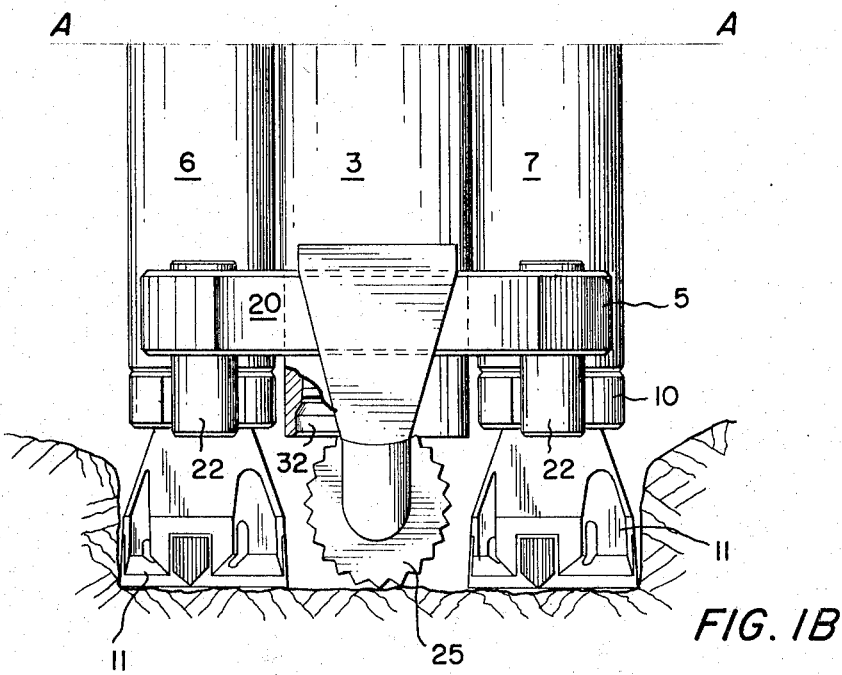
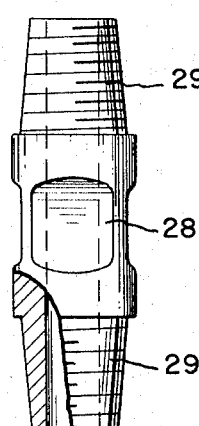
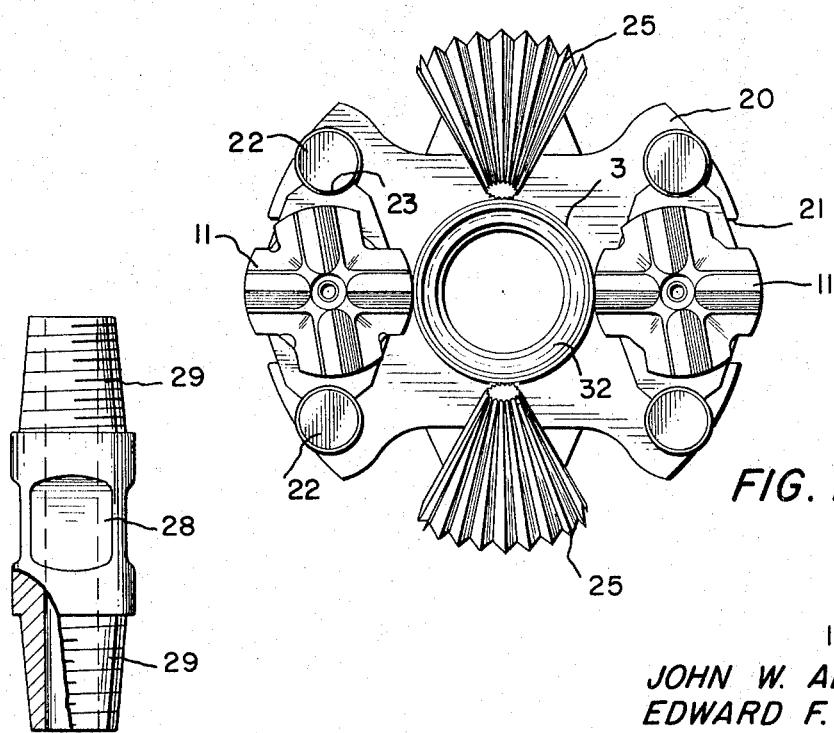

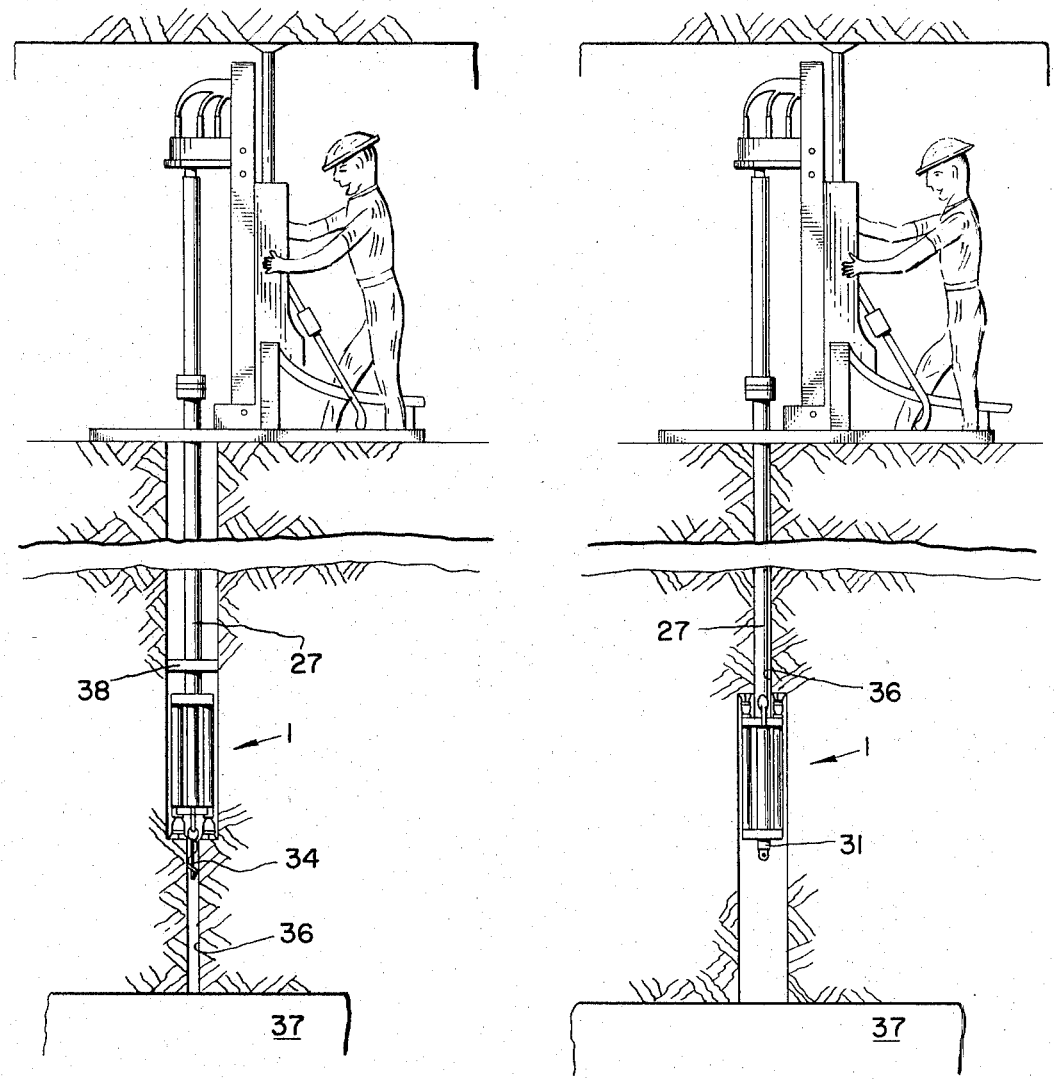

United States Patent Office 3,297,099
Patented Jan. 10, 1967

3,297,099
ROCK DRILL REAMER
John W. Adams, Staten Island, N.Y., and Edward F. Wickens, Phillipsburg, N.J., assignors to Ingersoll-Rand Company, New York, N.Y., a corporation of New Jersey
Filed May 28, 1964, Ser. No. 370,961
5 Claims. (Cl. 175—96)

This invention relates to the art of rock drilling large holes and more particularly to tools for reaming a relatively small drill hole to a larger diameter.

Conventional rock drill reamers are usually of the rotary non-percussive type wherein the reamer is merely rotated and pushed down in the hole to accomplish its reaming action. Such reamers have fairly slow cutting rates.

The principal object of this invention is to provide a rock drill reamer having a much faster cutting rate.

Other objects include the following: to provide a rock drill reamer which accomplishes its function by means of both rotation and percussion; to provide a percussive-type rock drill reamer; to provide a combination reamer which can be both pushed and pulled through a hole; and to provide a percussive-type rock drill reamer which is composed mainly of standard rock drills.

The objects of this invention are generally provided by mounting at least two percussive-type down hole rock drills on a frame including an axial tube extending between the ends of the drills and containing passages for supplying fluid pressure to the drills. The axial tube can be capped at either end and connected at the other uncapped end to a drill pipe which both feeds fluid pressure to the drills and rotates the reamer. As a result of either end of the reamer being adapted to be connected to the drill pipe, the reamer can either be pushed or pulled through a drill hole.

The invention is described in connection with the accompanying drawings wherein:

FIGS. 1A and 1B are broken elevational views of a rock drill reamer made in accordance with this invention, these views having portions cut away and being broken from each other along the line A—A;

FIG. 2 is a lower end view of the reamer of FIG. 1 looking at the bottoms of the drill bits;

FIG. 7 is a broken elevational view of a connecting nipple used for connecting the reamer to a drill pipe;

FIG. 8 is a somewhat diagrammatic and elevational view illustrating the use of the reamer when traveling up a hole; and FIG. 9 is another diagrammatic view illustrating an alternate way of using the reamer to travel down a hole.

Figure 1A:
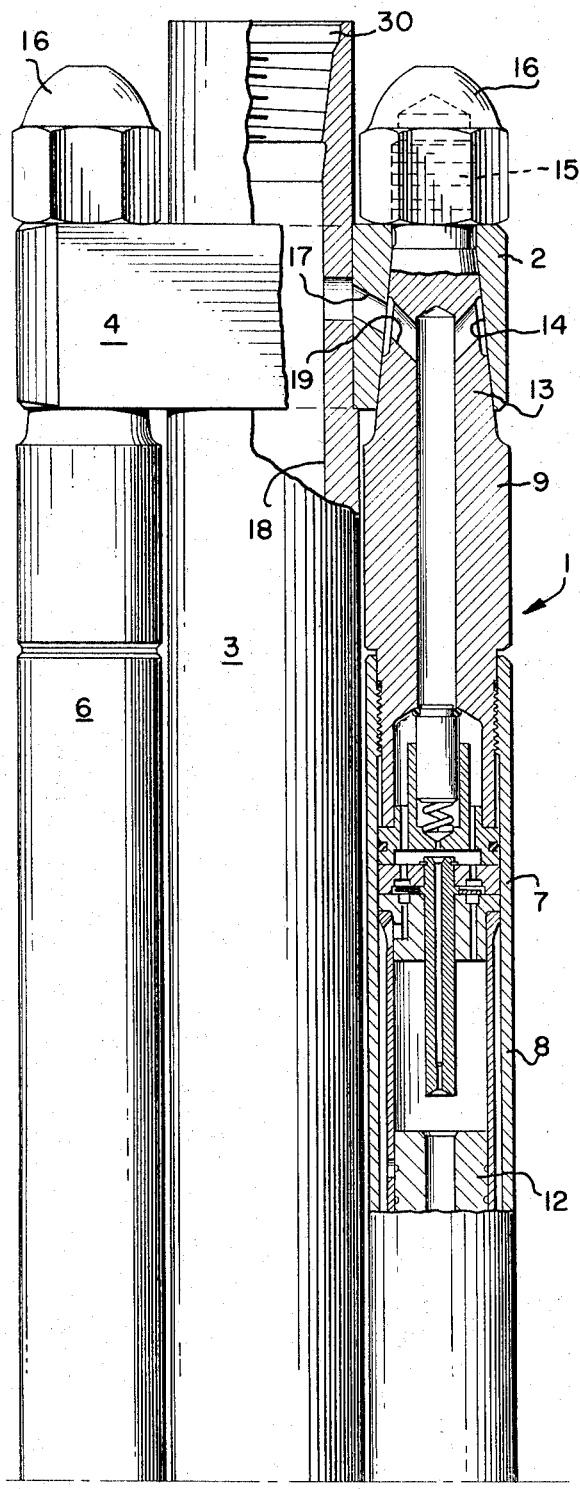

The rock drill reamer 1 illustrated in the drawings includes a frame 2 composed of an axially extending center tube 3, a backhead 4 fixed to the rear end portion of the tube 3 and a drill holder 5 attached to the front end portion of the tube 3. A pair of percussive down hole rock drills 6 and 7 are mounted in the frame 2 on opposite sides of the tube 3 and in parallel relationship with the tube 3 and with each other.

The rock drills 6 and 7 are conventional. Each includes an elongate tubular body 8 having a rear end 9 and a chuck 10 at its front end. The chuck 10 slidably supports a bit 11 in the body. A piston 12 reciprocates in the body 8 and strikes a series of hammer blows to the rear end of the bit 11. The piston 12 is driven back and forth by the admission of pressure fluid, such as compressed air, to the rear end 9 of the drill body 8. A conventional type of down hole rock drill is described in detail in the U.S. Patent No. 2,942,579, issued to W. A. Morrison, on June 28, 1960. The term "down hole drill" is applied to a rock drill having a hammer or percussive mechanism which goes down the hole with the drill bit.

Each rock drill 6 and 7 includes a tapered nipple 13 at its rear end 9 which seats in a corresponding tapered hole or socket 14 provided in the backhead 4. The tapered nipple 13 carries a threaded extension 15 which projects from the rear face of the backhead 4 and a nut 16 is screwed onto the extension 15 to hold the nipple 13 tightly in the socket 14. The backhead 4 contains a pair of internal passages 17 extending from the interior 18 of the tube 3 to the fluid inlet 19 in the nipple 13 for feeding fluid pressure to the drill. Thus, both drills 6 and 7 receive their actuating fluid pressure from the tube 3.

A holder flange 20 is integrally fixed to the tube 3 near its front end by welding or other suitable means. The flange 20 contains a pair of diametrically located notches 21 adapted to receive the drills 6 and 7. A pair of large keying pins 22 are fixed to the front face of the flange 20 on the opposite sides of each notch 21 and project forwardly of the front face of the flange 20. The chuck 10 of each drill 6 and 7 is provided with semi-arcuate sockets 23 which open outwardly and engage the key pins 22 to lock the drills in the flange 20. The drills 6 and 7 are assembled in the reamer flange 20 by sliding them axially rearward to engage the chuck sockets 23 with the key pins 22. Thereafter, the nut 16 is assembled on the nipple extension 15 to lock the drill in the backhead 4. As a result of this structure, the drills 6 and 7 are only locked at their rear ends against axial movement in the reamer 1 and the front flange 20 merely serves to hold the front of the drills parallel to the central tube 3 and to prevent the drills from rotating relative to the tube 3.

The reamer 1 is provided with a pair of conical rollers 25 at its bottom end for supporting the reamer in the bottom of a hole, thus preventing the drill bits 11 from being forced axially against the bottom of the hole with excessive force. In other words, the drills 6 and 7 are lifted off the bottom of the hole a slight distance by the rollers 25. The rollers 25 are rotatively mounted on brackets 26 integrally mounted on the front flange 20.

Figure 5:
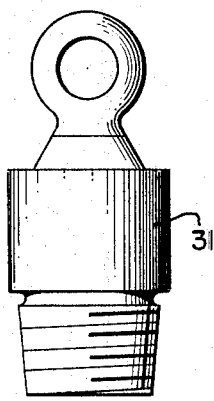
FIG. 5 is an elevational view of an accessory cap used with the reamer for closing its rear end when pulling the reamer through a hole.
Figure 3:
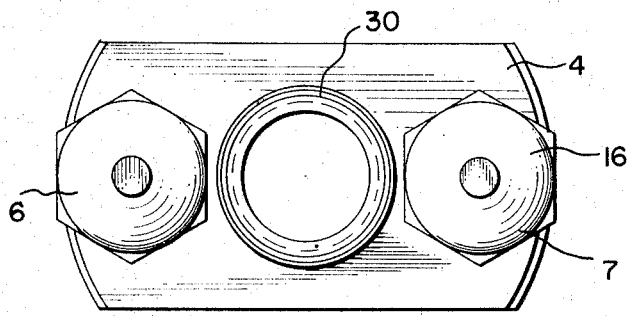
FIG. 3 is a top end view of the reamer of FIG. 1.
Figure 4:
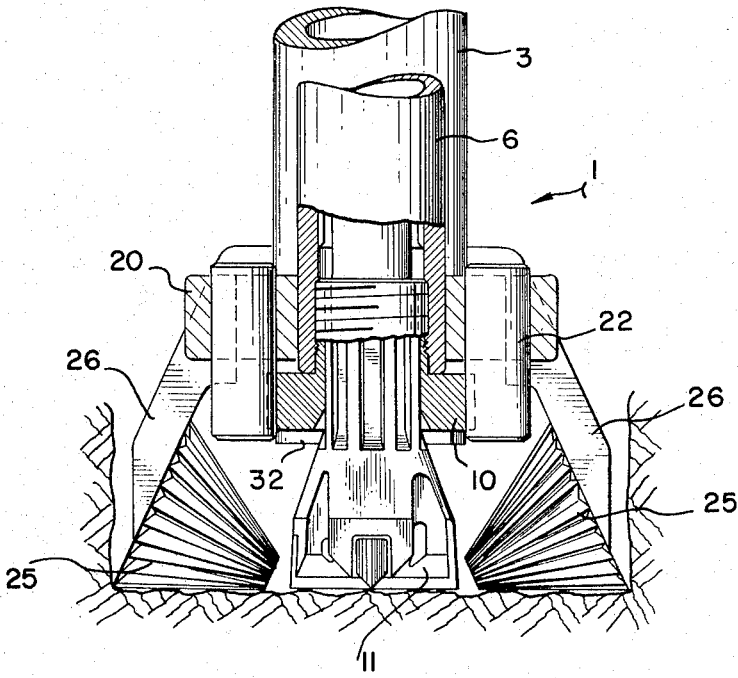
FIG. 4 is a fragmentary elevational view of the lower end of the reamer with portions being broken away.

Either end of the tube 3 is adapted to be connected to a drill rod or pipe 27, shown in FIGS. 8 and 9. The rear end 30 of the tube 3 projects beyond the backhead 4 and is provided with tapered internal threads. The connector nipple 28, shown in FIG. 7 having external threads 29 on both ends, is screwed into the tube 3 and the pipe 27 is screwed onto the other end of the nipple 28. An accessory plug 31, shown in FIG. 5, is provided to screw into the rear end 30 of the tube when it is not connected to a drill pipe 27. The plug 31 seals the rear end of the tube 3.

Figure 6:
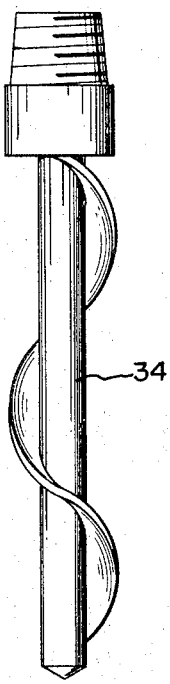
FIG. 6 is an elevational view of an accessory auger used on the front end of the reamer when pushing the reamer through a hole.

The front end 32 of the tube 3 also carries a female thread adapted to fit the connector nipple 28. The nipple 28 is used when the front end 32 of the tube 3 is connected to a drill pipe 27, as shown in FIG. 8. On the other hand, when the rear end 30 of the tube 3 is attached to a drill pipe 27, the front end 32 of the tube is closed by a pilot auger 34, shown in FIG. 6, which threads into the front end 32 and projects forward of the drill bits 11, as shown in FIG. 9. The pilot auger 34 is intended to fit into a previously drilled hole for guiding the reamer along the hole as the reamer is pushed forwardly and to push the cuttings created by the reamer down the previously drilled hole.

Operation

The reamer 1 may be used in either of two ways, "pull reaming," as shown in FIG. 8, or "push reaming," shown in FIG. 9.

In pull reaming, the drill pipe 27 is attached to the front end 32 of the tube 3, and the rear end of the tube 3 is sealed by the plug 31. After a drill hole 36 is completed and terminates in a chamber 37, which may be a mine shaft as shown in FIG. 8, the drill pipe 27 is extended through the drill hole 36 into the chamber 37 and the reamer 1 is attached to the drill pipe 27. Thereafter, fluid pressure, such as air, is fed to the drill pipe to drive the drills 6 and 7 and the drill pipe 27 is pulled through the drill hole 36 and simultaneously rotated. The reamer widens the hole 36 by a combination of rotating the drill bits 11 about the axis of the tube 3 and hammering the drill bits 11. This manner of reaming is very desirable where it can be employed since the debris or cuttings from the reamer can easily drop down the hole into the chamber 37. Otherwise, such cuttings will have to be blown upward through the drill hole and this requires much more cleansing fluid than is required for this type of reaming.

The more conventional type of reaming is shown in FIG. 9. The drill pipe 27 is attached to the rear end 30 of this tube and the pilot auger 34 is attached to the front end 32 of the tube 3. The reamer 1 is then pushed axially down the hole 36 and simultaneously rotated. At the same time, fluid pressure is fed through the drill pipe 27 to operate the drills 6 and 7 in percussion. As the reamer 1 is rotated in a clockwise direction, looking down the hole 36, the auger 34 screws the cuttings from the reamer down the hole 36. Thus, the auger 34 pushes the cuttings ahead of the reamer. A centralizer 38 is shown in FIG. 9 mounted on the pipe 27 to center the reamer 1 in the reamed hole. More than one of the centralizers 38 will be used in some situations.

Although a preferred embodiment of the invention is illustrated and described in detail, it will be understood that the invention is not limited simply to this embodiment, but contemplates other embodiments and variations which utilize the concepts and teachings of this invention.

Having described our invention, we claim:

1. A rock drill reamer of the percussive type comprising:
    (a) a frame including an elongated axial tube which is adapted at both ends to be connected to and supported on the bottom end of a drill pipe for feeding fluid pressure to the tube;
    (b) closure means to cap an end of the tube, said closure means being used to close the end of the tube which is not connected to the drill pipe;
    (c) said frame including a backhead fixed to the rear end portion of the tube and containing fluid passages connected to the interior of said tube for receiving fluid pressure from said tube;
    (d) a plurality of individual percussive-type down hole drills located alongside of said tube in parallel relationship and having their rear ends connected to and supported on said backhead with the passages in said backhead feeding fluid pressure to said drills;
    (e) holder means fixed on the front end portion of said tube and holding the front ends of said drills in parallel relationship to each other and to said tube;
    (f) said holder means being operative to release said drills from said tubes by sliding said drills axially forward relative to said tube; and
    (g) means for axially clamping said drills to said backhead to prevent them from moving axially forward relative to said tube.

2. The reamer of claim 1 wherein said holder means includes:
    (a) means for holding said drills in fixed rotative indexed position relative to said tube and to each other.

3. The reamer of claim 2 wherein said drill holder means includes:
    (a) keying means on a flange fixed to the front of said tube and engaging the chuck of each drill.

4. The reamer of claim 1 wherein:
    (a) each drill is threaded at its rear end and is fixed to the backhead by a nut threaded on its threaded rear end.

5. The reamer of claim 1 including:
    (a) an auger adapted to be mounted on the front end of the tube and having helical threads adapted to force cuttings ahead of the reamer during operation of the reamer.

References Cited by the Examiner
UNITED STATES PATENTS

| | | | |
|---|---|---|---|
| 936,494 | 10/1906 | Frich et al. | 175—96 |
| 1,461,713 | 7/1923 | Gilman et al. | 173—52 X |
| 1,612,338 | 12/1926 | Wilson et al. | 173—52 X |
| 1,993,365 | 3/1935 | Englebright et al. | 175—62 |
| 2,664,273 | 12/1953 | Merrick | 175—53 X |
| 2,982,254 | 5/1961 | Joelson | 175—96 X |

CHARLES E. O'CONNELL, *Primary Examiner.*

R. E. FAVREAU, *Assistant Examiner.*